Patented Nov. 21, 1950

2,530,570

UNITED STATES PATENT OFFICE 2,530,570

PYRIMIDYLMERCAPTO-CARBOXYLIC ACIDS AND DERIVATIVES THEREOF

Jean Druey, Riehen, Switzerland, assignor to Ciba Pharmaceutical Products, Inc., Summit, N. J.

No Drawing. Application December 3, 1947, Serial No. 789,552. In Switzerland December 9, 1946

6 Claims. (Cl. 260—251)

The present invention relates to new pyrimidyl-mercapto compounds and derivatives thereof, and to their preparation.

The compound 2-thiouracil (2-mercapto-4-hydroxy-pyrimidine) and a few 2-thiouracils substituted in the 6-position have found application in therapy for the treatment of hyperthyreosis. Experience has shown that a disadvantage of these compounds is their not inappreciable toxicity.

The present invention is based on the observation that the 4-hydroxy-pyrimidyl-(2)-mercapto-carboxylic acids of the formula

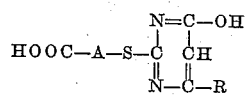

in which R represents a hydrocarbon radical containing 2 to 7 carbon atoms, such as an alkyl or aralkyl radical, and A represents a divalent aliphatic hydrocarbon radical containing 1 to 4 carbon atoms, especially a methylene group, and also salts, esters and amides of these acids, possess high antithyroid activity while being of low toxicity. These properties are especially unexpected as it is known that the 2-thiouracils lose their activity upon substitution in the mercapto group, for example by methyl or ethyl.

The new 4-hydroxy-pyrimidyl-(2)-mercapto-acetic acids and their derivatives are obtained by the action upon a 2-mercapto-4-hydroxy-pyrimidine of the formula

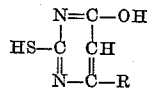

of a halogen-carboxylic acid of the formula Hal.A.COOH or a salt, ester or amide thereof.

Alternatively, the said compounds may be made by reacting carboxymethyl-pseudo-thiourea of the formula

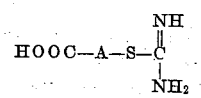

or an ester, salt or amide thereof with a β-keto-carboxylic acid ester of the formula

The new compounds may also be obtained by bringing a β-keto-carboxylic acid ester of the foregoing formula into reaction in a single reaction stage with thiourea and a halogen-carboxylic acid or a salt, ester or amide thereof.

In the above formulae R represents a hydocarbon radical containing 2 to 7 carbon atoms, A represents a divalent aliphatic hydrocarbon radical containing 1 to 4 carbon atoms, and COOR' represents an esterified carboxyl group. The esters obtained by the foregoing processes may, if desired, be hydrolyzed, or obtained acids may be treated with esterifying agents or converted into salts.

Among the substituted 2-mercapto-4-hydroxy-pyrimidines used as starting materials in the processes of the invention there may be mentioned, for example: 2-mercapto-4-hydroxy-6-ethyl-pyrimidine, 2-mercapto-4-hydroxy-6-n-propyl-pyrimidine, 2-mercapto-4-hydroxy-6-isoproypyl-pyrimidine, 2-mercapto-4-hydroxy-6-n-butyl-pyrimidine, 2-mercapto-4-hydroxy-6-iso-butyl-pyrimidine, 2-mercapto-4-hydroxy-6-tertiary-butyl-pyrimidine and 2-mercapto-4-hydroxy-6-benzyl-pyrimidine.

Corresponding to the aforesaid pyrimidines, the following β-keto-carboxylic acid esters are especially suitable for reaction with the pseudothioureas or with thiourea and a halogen-carboxylic acid: propionyl-acetic acid esters, butyryl-acetic acid esters, isobutyryl-acetic acid esters, n-valeryl-acetic acid esters, isovaleryl-acetic acid esters, γ:γ:γ-trimethyl-acetoacetic acid esters and γ-phenyl-acetoacetic acid esters.

Among the halogen-carboxylic acids and the esters and amides thereof, there are used, more especially, chloracetic acid and the said derivatives thereof on account of the fact that they are easy to prepare. There may also be used α- or β-bromopropionic acid, α-bromo-n-butyric acid, α-brom-isobutyric acid, α-brom-isovaleric acid or a salt, ester such as the ethyl ester, or amide of one of these acids.

The β-keto-carboxylic acid esters used as starting materials herein can be made by any one of the numerous methods known for their preparation, and the 2-mercapto-4-hydroxy-pyrimidines may be obtained, for example, by the condensation of the appropriately substituted β-keto-carboxylic acid esters with thiourea.

For reacting the 2-mercapto-4-hydroxy-pyrimidines with halogen-carboxylic acids or salts, esters or amides thereof it is of advantage to work in the presence of a diluent such as water or an organic solvent, for example, methyl alcohol, ethyl alcohol or acetone, and advantageously with the addition of an acid-binding agent. The reaction of the β-keto-carboxylic acid esters with thiourea and halogen-carboxylic acids or salts, esters or amides thereof, which leads in one operation to the products of the invention, is advantageously conducted in the presence of aqueous alkalis. This method of carrying out the reaction is also suitable for the condensation of the pseudo-thiourea derivatives with the β-keto-carboxylic acid esters. For the hydrolysis of resulting esters it is of advantage to work in the presence of alkalis. The conversion of the acids into their salts may be carried out by customary methods, either inorganic or organic bases being used as salt-forming agents. Sodium and ammonium salts are of special interest on account of their ready solubility, and also the calcium salts. For the formation of the salts physiologically active organic bases may also be used, for example, 2-aminothiazole on account of its known anti-thyroid activity.

The reaction of 2-mercapto-4-hydroxy-pyrimidine and 2-mercapto-4-hydroxy-6-methyl-pyrimidine with chloracetic acid ethyl ester and the hydrolysis of the so-obtained products have already been described. However, nothing has been published relative to the activity of the resultant known products; in fact, it has been found that they are considerably inferior to the products of the present invention as regards anti-thyroid activity.

The products of the invention posses therapeutic utility or serve as intermediates for the production of therapeutic agents.

The invention is illustrated in the following examples, in which the parts are by weight unless otherwise stated, and the relationship of parts by weight to parts by volume is the same as that of the gram to the cubic centimetre:

*Example 1*

17 parts of 2-mercapto-4-hydroxy-6-n-propyl-pyrimidine are dissolved in 90 parts by volume of a 3.3 N-solution of caustic soda, and mixed with 9.5 parts of mono-chloracetic acid. The reaction mixture is heated on the boiling water bath for ½ hour, and after cooling the mixture is rendered weakly acid to Congo with hydrochloric acid (1:1). 4-hydroxy-6-n-propyl-pyrimidyl-(2)-mercapto-acetic acid of the formula

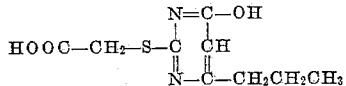

then separates in solid form. The new compound is colourless and melts at 152° C. accompanied by frothing. It is easily soluble in aqueous solutions of sodium bicarbonate with the formation of its sodium salt. The corresponding calcium salt can be obtained from a concentrated solution of the new compound by the addition of a concentrated solution of calcium chloride.

*Example 2*

30 parts by volume of a 2.6 molar aqueous solution of sodium chloracetate are added to a solution of 12 parts of 2-mercapto-4-hydroxy-6-ethyl-pyrimidine in 46 parts by volume of a 3.3 N-solution of caustic soda. The whole is then heated for ½ hour at 80–90° C., cooled and rendered weakly acid to Congo with hydrochloric acid (1:1). 4-ethyl-6-hydroxy-pyrimidyl-(2)-mercapto-acetic acid of the formula

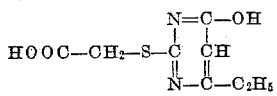

is thus precipitated in the form of a colourless substance. After recrystallisation from ethyl alcohol of 50 per cent. strength it melts at 170° C. By taking it up in dilute ammonia solution, and extensively concentrating the solution by evaporation the ammonium salt is obtained in a crystalline form.

*Example 3*

17 parts of 2-mercapto-4-hydroxy-6-n-propyl-pyrimidine are introduced into a sodium ethylate solution prepared from 2.3 parts of sodium and 50 parts by volume of absolute ethyl alcohol, and the whole is gradually mixed with 10.7 parts by volume of chloracetic acid ethyl ester. After boiling for 1 hour in a reflux apparatus the reaction ceases, and then the reaction mixture is freed from alcohol under reduced pressure. The solid residue is treated with water in order to remove the sodium chloride formed, filtered with suction, and recrystallised from ethyl alcohol of 50 per cent. strength. In this manner 4-hydroxy-6-n-propyl-pyrimidyl-(2)-mercapto-acetic acid ethyl ester of the formula

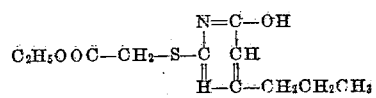

and melting at 118–119° C. is obtained in a pure form. This compound can also be obtained by reacting the compound described in Example 1 with ethyl alcohol in the presence of sulfuric acid.

*Example 4*

25.6 parts of 4-hydroxy-6-n-propyl-pyrimidyl-(2)-mercapto-acetic acid ethyl ester are dissolved in 75 parts by volume of a 2 N-solution of caustic soda, and the whole is heated for 1 hour on the boiling water bath. After cooling, the whole is neutralised with hydrochloric acid, freed from a precipitated by-product, and then the 4-hydroxy-6-n-propyl-pyrimidyl-(2)-mercapto-acetic acid is precipitated by the addition of further hydrochloric acid. The product has the same properties as the compound obtained as described in Example 1.

*Example 5*

A reaction mixture of 50 parts by volume of ethyl alcohol (containing 2.3 parts of sodium), 17 parts of 2-mercapto-4-hydroxy-6-n-propyl-pyrimidine and 18.1 parts of α-bromo-propionic acid ethyl ester is heated at the boil for one hour. The alcohol is then expelled under reduced pressure, and the residue is treated with water. By recrystallisation from ethyl alcohol of 70 per cent. strength there is obtained α-[4-hydroxy-6-n-propyl-pyrimidyl-(2)-mercapto]-propionic acid ethyl ester of the formula

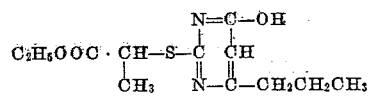

in a pure form melting at 101–102° C.

By alkaline hydrolysis in the manner described in Example 4, the corresponding acid melting at 147–148° C. is obtained.

*Example 6*

44 parts by volume of a 9 N-solution of caustic soda are slowly introduced dropwise into a reaction mixture containing 15.2 parts of thiourea, 19 parts of chloroacetic acid, 32 parts of n-butyryl-acetic acid ester, 22 parts by volume of a 9 N-solution of caustic soda and 200 parts by volume of water, while the whole is powerfully stirred, and the temperature rises to about 30° C. The whole is then allowed to stand at room temperature for 2 hours, and neutralised with an approximately 6-N-solution of hydrochloric acid. After allowing the whole to stand for 12 hours it is freed from a by-product by filtering with suction, and 4-hydroxy-6-n-propyl-pyrimidyl-(2)-mercapto-acetic acid is precipitated from the filtrate by means of hydrochloric acid. It melts at 152° C. and is identical with the compound obtained as described in Example 1 or 4.

*Example 7*

13.2 parts of carboxymethyl-pseudo-thiourea are agitated in 100 parts by volume of water with 14 parts of propionyl-acetic acid ester, during which 100 parts by volume of a 2-N-solution of caustic soda are gradually added. After a few hours the reaction mixture is neutralised with hydrochloric acid, and filtered after being allowed to stand for one day. The filtrate is rendered weakly acid to Congo with hydrochloric acid to precipitate 4-hydroxy-6-ethyl-pyrimidyl-(2)-mercapto-acetic acid. It is separated by filtering with suction, and recrystallised from aqueous alcohol. It melts at 170° C., like the compound obtained as described in Example 2.

*Example 8*

A mixture of 17 parts of 2-mercapto-4-hydroxy-6-n-propyl-pyrimidine, 15.3 parts of β-bromo-propionic acid and 78 parts by volume of a 3.85 N-solution of caustic soda is heated for ½ hour on the boiling water bath. The whole is then neutralised with hydrochloric acid 1:1, and filtered while warm in order to separate the precipitated substance. By the further addition of hydrochloric acid there is obtained from the filtrate β-[4-hydroxy-6-n-propyl-pyrimidyl-(2)-mercapto]-propionic acid of the formula

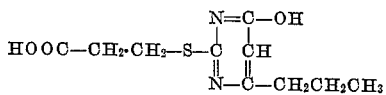

When recrystallised from ethyl alcohol of 50 per cent. strength it melts at 152–153° C.

*Example 9*

11 parts of 2-mercapto-4-hydroxy-6-benzyl-pyrimidine and 5 parts of chloracetic acid are dissolved in 45 parts by volume of a 3.4 N-solution of caustic soda and heated for ½ hour at 90° C. After cooling, the whole is acidified with hydrochloric acid, whereby the resulting 4-hydroxy-6-benzyl-pyrimidyl (2) - mercapto - acetic acid is precipitated. The new compound has the formula

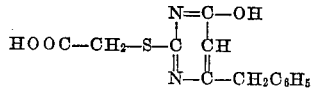

and melts at 186–188° C. after recrystallisation from ethyl alcohol.

*Example 10*

By the procedure described in Example 2, 8 or 9 there is obtained from 18 parts of α-brom-isovaleric acid, 17 parts of 2-mercapto-4-hydroxy-6-n-propyl-pyrimidine and 85 parts by volume of a 3.6 N-solution of caustic soda, α-[4-hydroxy- 6-n-propyl-pyrimidyl-(2) - mercapto] - isovaleric acid of the formula

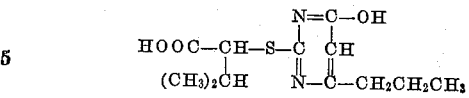

It melts at 153–154° C.

*Example 11*

A reaction mixture of 28 parts of α-brom-isobutyric acid ethyl ester, 24 parts of 2-mercapto-4-hydroxy-6-n-propyl-pyrimidine and 100 parts by volume of ethyl alcohol, in which 3.3 parts of sodium have been dissolved, is heated at the boil for 1 hour. By working up in the manner described in Example 3 or 5 there is obtained α[4 - hydroxy - 6 - n - propyl - pyrimidyl - (2) - mercapto]-isobutyric acid ethyl ester of the formula

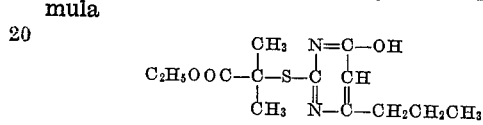

It melts at 90° C. By alkaline hydrolysis there is obtained the corresponding acid, which can also be obtained directly from α-bromo-isobutyric acid and 2-mercapto-4-hydroxy-6-n-propyl-pyrimidine advantageously in alcoholic solution in the presence of sodium. It melts at 145–146° C.

*Example 12*

A solution of 2.3 parts of sodium in 60 parts by volume of ethyl alcohol is heated for 1 hour on the boiling water bath with 17 parts of 2-mercapto-4-hydroxy-6-n-propyl-pyrimidine and 9.4 parts of chloracetamide. Upon cooling the reaction mixture solidifies. It is treated with 150 parts by volume of water, and filtered with suction. In this manner 16 parts of 4-hydroxy-6-n-propyl-pyrimidyl-(2)-mercapto acetic acid amide of the formula

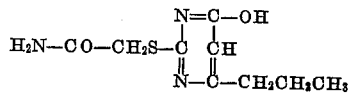

melting at 168° C. are obtained.

*Example 13*

23 parts of 4-hydroxy-6-n-propyl-pyrimidyl-(2)-mercapto-acetic acid and 10 parts of 2-amino-thiazole are dissolved with the aid of heat in 60 parts by volume of acetone. Upon cooling, the salt formed from the reaction components crystallises in fine white small needles. It melts at 123° C.

Having thus described the invention, what is claimed is:

1. A compound of the formula

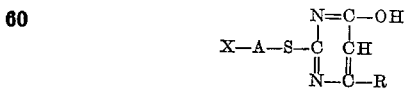

wherein X represents a member of the group consisting of free carboxylic acid and salts, esters and amides thereof, A represents an alkylene radical containing 1 to 4 carbon atoms, and R stands for a member selected from the group consisting of alkyl with 2 to 4 carbon atoms and benzyl.

2. A compound of the formula

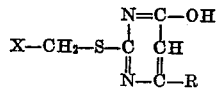

wherein X represents a member of the group consisting of free carboxylic acid and salts, esters and amides thereof, and R stands for a member selected from the group consisting of alkyl with 2 to 4 carbons atoms and benzyl.

3. A compound of the formula

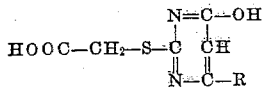

wherein R represents a member selected from the group consisting of alkyl with 2 to 4 carbon atoms and benzyl, and salts thereof.

4. A compound of the formula

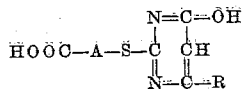

wherein A represents an alkylene radical containing 1 to 4 carbon atoms, and R represents a member selected from the group consisting of alkyl with 2 to 4 carbon atoms and benzyl, and salts thereof.

5. 4-hydroxy-6-n-propyl-pyrimidyl-(2)-mercapto-acetic acid and salts thereof.

6. 4-hydroxy-6-ethyl-pyrimidyl-(2)-mercapto-acetic acid and salts thereof.

JEAN DRUEY.

REFERENCES CITED

The following references are of record in the file of this patent:

Wheeler et al.: Amer. Chemical Journal 40, 553-554 and 547-548 (1908).

Chemical Abstracts 40, 1455[3] (1946).